United States Patent
Tang et al.

(10) Patent No.: US 10,733,817 B2
(45) Date of Patent: Aug. 4, 2020

(54) SECURITY PROCESSING METHOD FOR CAR SHARING SERVICE

(71) Applicant: Continental Automotive GmbH, Hannover (DE)

(72) Inventors: Shuanglin Tang, Pudong (CN); Yifeng Wang, Pudong (CN)

(*) Notice: Subject to any disclaimer, the term of this patent is extended or adjusted under 35 U.S.C. 154(b) by 0 days.

(21) Appl. No.: 16/195,118

(22) Filed: Nov. 19, 2018

(65) Prior Publication Data
US 2019/0156605 A1    May 23, 2019

(30) Foreign Application Priority Data

Nov. 23, 2017   (CN) .......................... 2017 1 1182810

(51) Int. Cl.
*G07C 9/00* (2020.01)
*G06Q 50/30* (2012.01)
(Continued)

(52) U.S. Cl.
CPC ........ *G07C 9/00309* (2013.01); *B60R 25/241* (2013.01); *G06Q 30/0645* (2013.01);
(Continued)

(58) Field of Classification Search
CPC ............ G07C 9/00103; G07C 9/00309; G07C 2009/00388; G07C 2009/00412; G07C 2009/00468; G07C 2009/005; G07C 2009/0088; B60R 25/24; B60R 25/241; B60R 25/246; B60R 25/2018; B60R 2325/108; B60R 2325/20; B60R 2325/205; G06Q 50/30; G06Q 30/0645;
(Continued)

(56) References Cited

U.S. PATENT DOCUMENTS

2014/0079217 A1* 3/2014 Bai ...................... H04L 63/0869
                                                            380/270
2015/0348178 A1* 12/2015 Taylor ................ G06Q 30/0645
                                                            705/307

(Continued)

FOREIGN PATENT DOCUMENTS

CN        103686713         3/2014
CN        105539365         5/2016
(Continued)

*Primary Examiner* — Edwin C Holloway, III
(74) *Attorney, Agent, or Firm* — Cozen O'Connor

(57) ABSTRACT

A security processing method for a car sharing service includes: a smart terminal encrypting a second random code according to a first smart terminal encryption key, to obtain a first cyphertext, the first smart terminal encryption key having a first random code and order form information from a cloud server; the smart terminal receiving a third random code from a vehicle, the vehicle obtaining the third random code by decrypting the first cyphertext according to a first vehicle encryption key that includes the first random code and the order form information sent by the cloud server; the smart terminal subjecting the second random code and the third random code to comparative verification, to obtain an identity authentication result; the smart terminal sending, if the identity authentication result has passed, encrypted service data to the vehicle; and the vehicle decrypting the service data to execute the service data.

10 Claims, 2 Drawing Sheets

(51) Int. Cl.
  *B60R 25/24* (2013.01)
  *H04L 29/06* (2006.01)
  *H04W 12/06* (2009.01)
  *H04W 4/80* (2018.01)
  *H04W 12/08* (2009.01)
  *G06Q 30/06* (2012.01)

(52) U.S. Cl.
  CPC ......... *G06Q 50/30* (2013.01); *H04L 63/0435* (2013.01); *H04L 63/068* (2013.01); *H04W 4/80* (2018.02); *H04W 12/06* (2013.01); *H04W 12/08* (2013.01); *G07C 2009/005* (2013.01); *G07C 2009/00412* (2013.01); *G07C 2009/00468* (2013.01)

(58) Field of Classification Search
  CPC .... H04L 63/0435; H04L 63/068; H04W 4/80; H04W 12/06; H04W 12/08
  USPC ....................................................... 340/5.72
  See application file for complete search history.

(56) References Cited

U.S. PATENT DOCUMENTS

| | | | |
|---|---|---|---|
| 2016/0055699 A1* | 2/2016 | Vincenti | G07C 9/00309 340/5.61 |
| 2017/0134382 A1* | 5/2017 | Darnell | H04L 67/12 |
| 2017/0178035 A1* | 6/2017 | Grimm | H04W 12/06 |

FOREIGN PATENT DOCUMENTS

| | | |
|---|---|---|
| CN | 105847282 | 8/2016 |
| CN | 106603470 | 4/2017 |
| CN | 106878008 | 6/2017 |
| CN | 107067563 | 8/2017 |
| EP | 2743868 A1 * | 6/2014 |

* cited by examiner

SECURITY PROCESSING METHOD FOR CAR SHARING SERVICE

BACKGROUND OF THE INVENTION

1. Field of the Invention

The present invention relates to the technical field of motor vehicle control, in particular to a security processing method for a car sharing service.

2. Description of the Related Art

The concept of car-sharing originated in the US, and has experienced nearly 18 years of development since Zipcar went online in 1999, but has not become popularized on a large scale in the market. In recent years, especially in China, as the sharing economy has taken root in people's mentality, car-sharing has become the next flash point, having resolved to a certain extent the problems of urban traffic congestion, driving restriction and parking place saturation, and having also resolved the travel difficulties of those who hold a driving license but cannot afford to buy a car.

As shown in FIG. 1, a basic car sharing system consists of a vehicle to be shared, a user control terminal and a cloud server. A remote information processor module (Telematics Box, i.e., T-Box) in the vehicle to be shared is used for receiving instructions sent by the user control terminal and the cloud server. At the present time, user control terminals have substantially been replaced by smart terminals, typically smart phones; by installing application software matched to the car sharing system in the smart terminal, security authentication is performed with the cloud server, and the cloud server or the smart terminal sends an instruction to the vehicle to be shared, so that the vehicle executes a corresponding operation.

In general, some kind of security measure is bound to be used in the course of data transmission between the smart terminal and the cloud server, and between the cloud server and the T-Box, to increase the level of security. The Secure Sockets Layer (SSL) and Transport Layer Security (TLS) protocols are underlying technology of encrypted communication over the internet, and are used to provide communication security and network traffic privacy security by transmission encryption via the Internet. In addition, BLUETOOTH® technology is mostly used for near-field communication; when a user carries a smart phone having a BLUETOOTH® function into a BLUETOOTH® communication range, data transmission is immediately carried out between the vehicle and the smart phone.

However, in the abovemenioned security protocols: 1) The fact that a wireless transmission security protocol operates above an unreliable wireless datagram protocol leads to these items of information being intercepted during transmission, and the server is thereby duped, to obtain authorization/authentication; this will pose a serious threat to information security. 2) Although the BLUETOOTH® technology has a certain level of security, it can only be used for near-field communication, due to the limitations thereof in terms of transmission distance; hence, there is still the security risk that a transmitted signal will be intercepted by another device located within the range of the signal. 3) In the case of a conventional identity authentication method based on a symmetric password system, i.e., using a password algorithm and an encryption key, encrypting plaintext to generate ciphertext, and transmitting between a smart terminal and an onboard terminal together with a random code, etc., the password can be easily obtained through diassembly and static analysis, etc., of a binary document, so there is a security risk.

SUMMARY OF THE INVENTION

It is an object of the present invention to solve the above-mentioned problems of the prior art. The object may be achieved, according to one aspect of the present invention, by providing a security processing method for a car sharing service; by introducing an additional communication link security protocol on the basis of a near-field transmission protocol, such as the BLUETOOTH® transmission protocol, the security of near-field communication between a smart terminal and a vehicle is ensured, and the level of security with which vehicles can be used is increased.

To solve the abovementioned problem, in one aspect, a security processing method is provided for a car sharing service, the method including: a smart terminal encrypting a second random code according to a first smart terminal encryption key, to obtain a first cyphertext, the first smart terminal encryption key comprising a first random code and order form information sent by a cloud server; the smart terminal receiving a third random code sent by a vehicle, the third random code being obtained by the vehicle by decrypting the first cyphertext according to a first vehicle encryption key, the first vehicle encryption key comprising the first random code and the order form information sent by the cloud server; the smart terminal subjecting the second random code and the third random code to comparative verification, to obtain an identity authentication result; when the identity authentication result has passed, the smart terminal sending encrypted service data to the vehicle; and the vehicle decrypting the service data to execute the service data.

Compared with the prior art, the solution described above has the following beneficial technical effects:

In the course of a user using a car sharing service, it is necessary to continually use BLUETOOTH® to communicate with a vehicle. In the present invention, on the basis of an existing BLUETOOTH® transmission protocol, an additional communication link security protocol is introduced; data that is encrypted using this protocol is generated according to a vehicle use request sent by a vehicle user, and is therefore effective for a given period of time, and an encryption key that is used for each communication between the smart terminal and the vehicle is also unique. Hence, the security of near-field communication between the smart terminal and the vehicle can be ensured, improving the security of car sharing as well as the vehicle user experience.

BRIEF DESCRIPTION OF THE DRAWINGS

Other details and advantages of the present invention will become obvious through the detailed description provided below. The detailed description below makes reference to the accompanying drawings, wherein.

DETAILED DESCRIPTION OF THE PRESENTLY PREFERRED EMBODIMENTS

In the following description, many specific details are set forth in order to provide those skilled in the art a more comprehensive understanding of the present invention. However, it will be recognized by those skilled in the art that the implementation of the present invention may omit some of these specific details. Furthermore, it should be understood that the present invention is not limited to the specific embodiments presented. On the contrary, the use of any combination of the features and key elements below to implement the present invention may be considered, regardless of whether they relate to different embodiments. Also, while the exemplary embodiment discuss the use of the well-known BLUETOOTH® protocol, the invention may be used with other near-field technologies. Thus, the aspects, features, embodiments and advantages below are merely explanatory, and should not be regarded as key elements or definitions of the claims, unless clearly stated in the claims.

In the prior art, based on an existing car sharing system, a user, after completing cloud authentication, connects with a vehicle via BLUETOOTH® by a smart terminal held by the user, and sends a corresponding instruction to the vehicle. However, BLUETOOTH® interception devices on the market are relatively cheap, and near-field communication between the user and the vehicle can be intercepted very easily, so there is a considerable security risk.

According to one embodiment of the present invention, there is provided: a smart terminal encrypting a second random code according to a first smart terminal encryption key, to obtain a first cyphertext, the first smart terminal encryption key comprising a first random code and order form information sent by a cloud server; the smart terminal receiving a third random code sent by a vehicle, the third random code being obtained by the vehicle by decrypting the first cyphertext according to a first vehicle encryption key, the first vehicle encryption key comprising the first random code and the order form information sent by the cloud server; the smart terminal subjecting the second random code and the third random code to comparative verification, to obtain an identity authentication result; when the identity authentication result has passed, the smart terminal sending encrypted service data to the vehicle; and the vehicle decrypting the service data to execute the service data.

Figure 1:
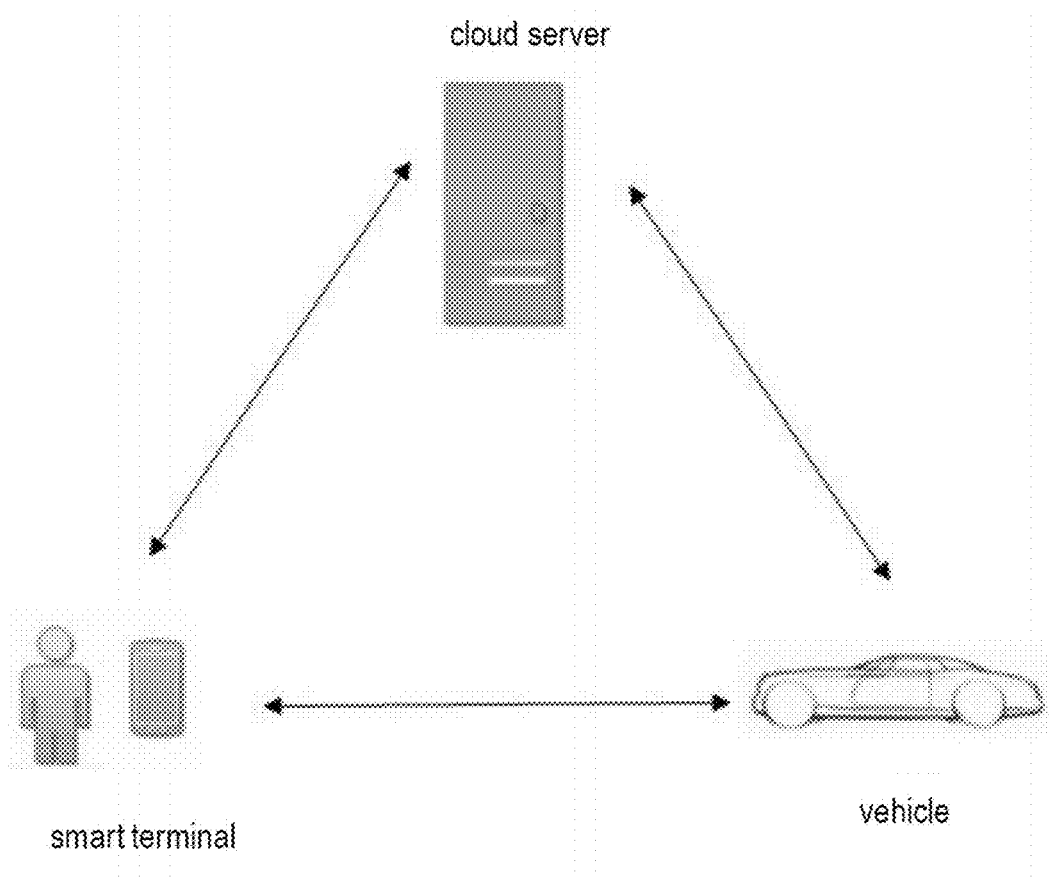
FIG. 1 is a schematic diagram of an implementation of a basic car sharing system in the prior art.
Figure 2:
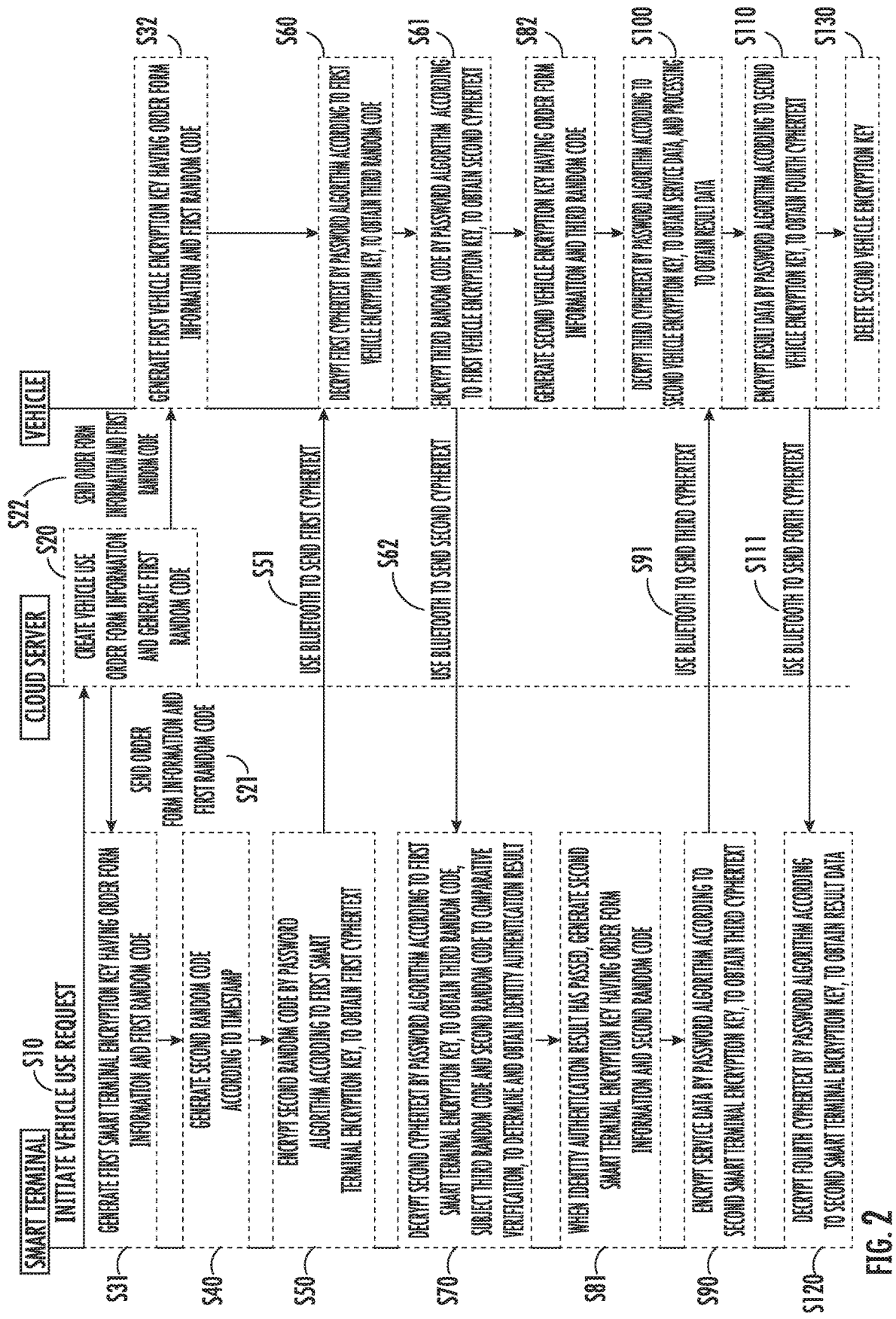
FIG. 2 is a flow chart of an embodiment of the security processing method for a car sharing service according to an embodiment of the present invention.

The secure processing method for a car sharing service according to an aspect of the present invention is explained further below by way of examples, with reference to the accompanying drawings. Referring to FIG. 2, in this embodiment, based on a basic car sharing system, included are a smart terminal, a cloud server and a vehicle. The smart terminal is an everyday smart phone, in which is installed application software suitable for car sharing. The vehicle is an onboard T-Box, and the cloud server is a cloud remote service provider (TSP, Telematics Service Provider) of the Internet of Vehicles. Connections between the smart terminal/vehicle and the cloud server use Hyper-Text Transfer Protocol Secure (HTTPS) for communication.

Execution steps are described in sequence below, taking a service processing procedure of car sharing as an example:

Step S10: when a user needs to use a vehicle, a vehicle use request is sent to the cloud server by application software in the smart terminal.

Steps S20-S22: once the cloud server has received the vehicle use request of the user, a vehicle use order form is created and a first random code is generated for this vehicle use request in the cloud server; the first random code is a random number configured by the cloud server, and order form information of the vehicle use order form comprises an order form number, a time when the order form becomes effective or a time when the order form ceases to be effective. For one vehicle use request, the order form information and the first random code are both unique and are effective for a given period of time; when the vehicle use order form has ceased to be effective due to behavior such as order form completion or cancellation, the order form information and the first random code generated in this vehicle use request will also of course cease to be effective. The cloud server then sends the order form information and the first random code generated in this vehicle use request to the smart terminal, at Step S21, and the vehicle, at Step S22, simultaneously, for the purpose of subsequently generating a first smart terminal encryption key and a first vehicle encryption key.

Steps S31-S32: the smart terminal, at Step S31, and the vehicle, at Step S32, generate the first smart terminal encryption key and the first vehicle encryption key, respectively, according to the order form information and the first random code received from the cloud server; since the smart terminal and the vehicle use the same password algorithm, and both include the first random code and the order form information sent by the same cloud server, the first encryption keys generated by the smart terminal and the vehicle are identical, and are used for subsequent data exchange and data encryption/decryption.

If, in Steps S31-S32, the first encryption keys generated by the smart terminal and the vehicle are not identical, this will result in inconsistency in the subsequent decryption of a second random code and a third random code. The reason for the first encryption keys generated in Steps S31-S32 by the smart terminal and the vehicle being different is that data interception has taken place, or transmitted data has been tampered with, during the sending of the order form information and the first random code to the smart terminal and the vehicle by the cloud server; this will directly result in final identity authentication failure.

Step S40: the smart terminal generates the second random code according to a timestamp. The second random code is unique and is effective for a given period of time, and will cease to be effective once service data has been sent and result data fed back by the vehicle has been obtained. In other words, one second random code is only used to execute one service instruction. If it is necessary to send a service instruction again, the smart terminal must again generate a completely new and unique second random code which is effective for a given period of time, in order to ensure communication security.

Steps S50-S51: the smart terminal encrypts the second random code by the password algorithm, according to the first smart terminal encryption key generated in Step S31, to obtain a first cyphertext. Immediately afterwards, Step S51 is executed: the first cyphertext generated is sent by BLUETOOTH® to the vehicle T-Box. Since there is a certain time delay between the user sending the vehicle use request to the cloud server and actually using the vehicle, the execution of Steps S50-S51 above begins from a time when the smart terminal is close to the vehicle.

In this embodiment, the password algorithm used is a symmetric encryption algorithm; a characteristic thereof is that this type of password algorithm uses the same encryption key when encryption and decryption are performed, including but not limited to the DES algorithm, 3DES/edeDES/TDES algorithm, Twofish algorithm, Blowfish algorithm, RC2 algorithm, RC4 algorithm, RC5 algorithm, RC6 algorithm, PBE algorithm, CAST algorithm and IDEA algorithm. Preferably, the password algorithm used in this embodiment is the Advanced Encryption Standard: AES.

Steps S60-S62: after receiving the first cyphertext sent by the smart terminal, the vehicle T-Box decrypts the first cyphertext by the password algorithm according to the first vehicle encryption key generated in Step S32, to obtain the third random code. Immediately afterwards, Step S61 is executed: the third random code is encrypted by the password algorithm according to the first vehicle encryption key, to obtain a second cyphertext. Step S62 is then executed: the second cyphertext is sent by BLUETOOTH® to the smart terminal for identity verification.

Step S70: after receiving the second cyphertext sent back by the vehicle T-Box, the smart terminal subjects the T-Box to identity authentication. The second cyphertext is decrypted by the password algorithm according to the first smart terminal encryption key, to obtain the third random code; the third random code and the second random code are subjected to comparative verification, to determine and obtain an identity authentication result. It is known from Steps S20-S32 that the first encryption keys generated by the vehicle and the smart terminal are identical. Furthermore, since the third random code is generated by the T-Box by using the same password algorithm as that of the smart terminal to decrypt and encrypt the cyphertext sent by the smart terminal according to the first vehicle encryption key identical to that of the smart terminal, the second random code and the third random code should be identical. In other words, if the smart terminal determines that the second random code and the third random code are identical in Step S70, then it may be concluded that the identity authentication of the vehicle T-Box has passed; if the second random code and the third random code are not identical, authentication fails, and the execution of subsequent steps is terminated.

In the operation described above, reasons for the failure of identity authentication might be: 1) data is intercepted or tampered with in the course of BLUETOOTH® near-field communication, resulting in the failure of identity authentication; 2) data interception has taken place, or transmitted data has been tampered with, during the sending of the order form information and the first random code to the smart terminal and the vehicle by the cloud server.

Steps S81-S82: after determining that identity authentication of the vehicle T-Box has passed, the smart terminal generates a second smart terminal encryption key having the order form information and the second random code. At the same time, the T-Box terminal also executes the same operation, generating a second vehicle encryption key having the order form information and the second random code. Since the smart terminal and the vehicle use the same password algorithm, and both include the first random code and the order form information sent by the same cloud server, the second encryption keys generated by the smart terminal and the vehicle are identical, and are used for subsequent data exchange and data encryption/decryption.

In order to increase the data security of the entire procedure, the first encryption keys (comprising the first smart terminal encryption key and the first vehicle encryption key) and the second encryption keys (comprising the second smart terminal encryption key and the second vehicle encryption key) may use different order form information data. For example, even though the first encryption key and the second encryption key both use the order form information, the first encryption key and the second encryption key only use parts of the information in the order form information, with no overlap therebetween; the first encryption key may use information such as the order form number and the time when the order form becomes effective in the order form information, and the second encryption key uses information such as the time when the order form ceases to be effective in the order form information.

In addition, since the existing password algorithm can be cracked easily, content of the order form information is added during generation of the encryption keys; the order form information is called a salt value in this process, and through a salt hash operation, even if an attacker intercepts the data midway, it will be very difficult to push data content back out; this ensures the security of user data to a greater degree.

Steps S90-S91: the smart terminal encrypts service data by the password algorithm according to the second smart terminal encryption key generated in Step S81, to obtain a third cyphertext. The content of the service data is very wide-ranging, and essentially may encompass all control instructions and motor vehicle state information, from which the user selects one; one item of service data is sent each time, including but not limited to a vehicle door unlocking instruction, a vehicle door locking instruction, a trunk opening instruction, a trunk locking instruction, vehicle lamp on/off instructions, vehicle window opening/closing instructions, a GPS position report, a vehicle ignition state and vehicle mileage data. Immediately afterwards, Step S91 is executed: the third cyphertext is sent by BLUETOOTH® to the vehicle T-Box.

Step S100: after receiving the third cyphertext sent by the smart terminal, the vehicle T-Box decrypts the third cyphertext by the password algorithm according to the second vehicle encryption key, to obtain the service data, and sends this to a vehicle body control module to execute a corresponding operation, and obtains an operation result fed back in the vehicle body control module, i.e., result data.

Steps S110-S111: the vehicle T-Box encrypts the obtained result data by the password algorithm according to the second vehicle encryption key, to obtain a fourth cyphertext. The fourth cyphertext is then sent by BLUETOOTH® to the smart terminal S111.

Step S120: the smart terminal decrypts the fourth cyphertext by the password algorithm according to the second smart terminal encryption key, to obtain content of the result data, and presents the content of the result data to the user via a user interface of the application software installed in the smart terminal, for the user to execute the next operation step.

Step S130: after executing Steps S110-S111, the vehicle T-Box deletes information of the second vehicle encryption key, in order to prevent replay.

In this embodiment, the security of user data is ensured by a double encryption form. The data encrypted and transmitted using the first encryption keys (comprising the first smart terminal encryption key and the first vehicle encryption key) does not contain real data information; the objective thereof is to subject the vehicle to identity verification, and ensure that information is not intercepted in the course of data transmission between the cloud server and the vehicle/smart terminal and between the vehicle and the smart terminal. Immediately afterwards, once it has been confirmed that identity authentication has passed, the second encryption keys (comprising the second smart terminal encryption key and the second vehicle encryption key) encrypt real service data, completing data exchange.

In this embodiment, in one vehicle use request, i.e., during the generation of one user order form by the cloud server, the first encryption keys (comprising the first smart terminal encryption key and the first vehicle encryption key) are unique and are effective for a given period of time. In other words, when the user sends a vehicle use request again, the cloud server will again generate order form information and a first random code and send these to the smart terminal and the vehicle; at this time, the smart terminal and the vehicle will again generate a unique first encryption key, which is effective for a given period of time.

In this embodiment, during a single sending of service data, the second encryption keys (comprising the second smart terminal encryption key and the second vehicle encryption key) are unique and are effective for a given period of time; the second encryption keys are only effective for one exchange of service data. In other words, if the user needs to execute a service data sending instruction again, it is necessary to execute Steps S40 to S81 again, and to generate a new second random code; the security of data exchange is thereby ensured.

Those skilled in the art will understand that all or some of the steps in the various methods in the embodiments above may be completed by relevant hardware by program instructions; the program may be stored in a non-transitory computer-readable storage medium which may include: ROM, RAM, magnetic disk or optical disk, etc. Although the present invention has been disclosed above by way of preferred embodiments, the present invention is not limited thereto. Changes and amendments of all kinds made within the spirit and scope of the present invention by any person skilled in the art shall be included in the scope of protection of the present invention. Thus the scope of protection of the present invention shall be the scope defined by the claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A security processing method for a car sharing service, comprising:
    encrypting, by a smart terminal, a second random code by a password algorithm according to a first smart terminal encryption key, to obtain a first cyphertext, the first smart terminal encryption key generated by the smart terminal based on a first random code and order form information received, via Hyper-Text Transfer Protocol Secure (HTTPS), from a cloud server;
    sending, by the smart terminal, via a near-field communication protocol, the first cyphertext to a vehicle;
    receiving, by the smart terminal, via the near-field communication protocol, a second cyphertext sent by the vehicle, and the smart terminal obtaining, by decrypting the received second cyphertext according to the first smart terminal encryption key, a third random code having been obtained by the vehicle by decrypting the first cyphertext by the password algorithm according to the first vehicle encryption key, the first vehicle encryption key having been generated by the vehicle based on the first random code and the order form information sent to the vehicle, via Hyper-Text Transfer Protocol Secure (HTTPS), by the cloud server;
    subjecting, by the smart terminal, the second random code and the third random code to comparative verification, to obtain an identity authentication result;
    sending, by the smart terminal, via the near-field communication protocol, in the event the identity authentication result has passed, a third cyphertext having encrypted service data to the vehicle; and
    decrypting, by the vehicle, the third cyphertext to obtain the service data to execute the service data.

2. The method as claimed in claim 1, wherein the first random code is a random number configured by the cloud server in response to a vehicle use request initiated by the smart terminal via Hyper-Text Transfer Protocol Secure (HTTPS).

3. The method as claimed in claim 1, wherein:
    the encrypting, by the smart terminal, of the service data is performed according to a second smart terminal encryption key, the second smart terminal encryption key comprising the second random code, as well as the order form information sent by the cloud server; and
    the decrypting, by the vehicle, of the third cyphertext to obtain the service data is performed according to a second vehicle encryption key, the second vehicle encryption key comprising the third random code, as well as the order form information sent by the cloud server.

4. The method as claimed in claim 3, wherein the first smart terminal encryption key, the first vehicle encryption key, the second smart terminal encryption key and the second vehicle encryption key are unique and are effective for a given period of time.

5. The method as claimed in claim 1, wherein the order form information is at least one selected from the group of: an order form number, a time when an order form becomes effective, and a time when the order form ceases to be effective.

6. The method as claimed in claim 1, wherein the second random code is generated according to a timestamp synchronized with the smart terminal.

7. The method as claimed in claim 1, wherein the smart terminal and the vehicle use identical encryption algorithms and decryption algorithms.

8. The method as claimed in claim 7, wherein the encryption algorithms and the decryption algorithms are the Advanced Encryption Standard.

9. The method as claimed in claim 1, wherein the service data comprises one selected from the group of: a vehicle door unlocking instruction, a vehicle door locking instruction, a trunk opening instruction, a trunk locking instruction, vehicle lamp on/off instructions, vehicle window opening/closing instructions, a GPS position report, a vehicle ignition state and vehicle mileage data.

10. The method as claimed in claim 1, further comprising:
    deleting, by the vehicle, the second vehicle encryption key prior to the sending of new service data.

* * * * *